United States Patent [19]

Dirr

[11] Patent Number: 4,947,483

[45] Date of Patent: Aug. 7, 1990

[54] PROCESS FOR TRANSMISSION OF ANALOG AND/OR DIGITAL INFORMATION, ESPECIALLY WITH AN IN-LINE ARRANGEMENT OF ONE, TWO OR MORE EXCHANGES IN TELECOMMUNICATIONS SYSTEMS

[76] Inventor: Josef Dirr, Neufahrner Strasse 5, D-8000 Munchen 80, Fed. Rep. of Germany

[21] Appl. No.: 147,455

[22] Filed: Jan. 25, 1988

[30] Foreign Application Priority Data

Jan. 26, 1987 [DE] Fed. Rep. of Germany ....... 3702202

[51] Int. Cl.[5] .............................................. H04L 5/06
[52] U.S. Cl. ......................................... 370/30; 370/32
[58] Field of Search ........................ 370/24, 27, 30, 32, 370/76; 375/39

[56] References Cited

U.S. PATENT DOCUMENTS

| | | | |
|---|---|---|---|
| 3,555,193 | 1/1971 | Brand et al. | |
| 3,769,463 | 10/1973 | Graham et al. | |
| 4,101,833 | 7/1978 | Bingham et al. | 370/30 |
| 4,236,244 | 11/1980 | Strehl | 370/30 |
| 4,302,629 | 11/1981 | Foulkes et al. | 370/122 |
| 4,335,455 | 6/1982 | Hirschmann | 370/32 |
| 4,402,076 | 8/1983 | Krajewski | 370/30 |
| 4,597,073 | 6/1986 | Staples | 370/30 |
| 4,731,798 | 3/1988 | Dirr | 375/39 |
| 4,799,213 | 1/1989 | Fitzgerald | 370/30 |

Primary Examiner—Douglas W. Olms
Assistant Examiner—Melvin Marcelo
Attorney, Agent, or Firm—Kinzer, Plyer, Dorn, McEachran & Jambor

[57] ABSTRACT

In transmission of information over junction routes with exchanges, the feedback circuits that occur in hybrid sets are a major problem. High demands are made of them and the balancing networks. This invention eliminates these shortcomings in that quasi-4-wire circuits are formed by providing coded alternating currents of different frequencies and/or frequency positions for the two transmission directions and filters with high stop band attenuation for the opposite direction are provided when it is necessary to separate the two transmission directions.

21 Claims, 10 Drawing Sheets

PROCESS FOR TRANSMISSION OF ANALOG AND/OR DIGITAL INFORMATION, ESPECIALLY WITH AN IN-LINE ARRANGEMENT OF ONE, TWO OR MORE EXCHANGES IN TELECOMMUNICATIONS SYSTEMS

The present invention concerns systems for transmission of analog and/or digital information, especially with an in-line arrangement of one, two or more exchanges in telecommunications systems.

A major technical problem in transmission of information over communication paths, especially long distance communication paths with exchanges and amplifiers, is the feedback or regenerative circuits. In order to assure the stability of the connections, high demands are made of the hybrid sets and balancing networks. The ideal state would of course be a 4-wire connection from the calling subscriber to the called subscriber. The local exchanges are always designed as 2-wire systems, however. A change to a 4-wire operation would be impossible for economic reasons.

The purpose of the present invention is thus to provide a system whereby the regenerative circuits can be suppressed much more effectively than with previous circuits and the local exchanges in their 2-wire circuits can be operated as quasi-4-wire paths. According to CCITT recommendations, fourteen analog/digital converter pairs are permitted in an international connection with five provided for the national connections. In the present invention, such analog/digital converter pairs are replaced by simple devices with virtually no feedback. With this equipment, existing 2-wire connections can also be switched to quasi-4-wire connections. Thus, a quasi-4-wire connection can be established from the subscriber over a 2-wire exchange as far as the long distance connection. All that is necessary to accomplish this is to provide different frequencies or frequency positions for the information in the transmitting and receiving directions.

It is advantageous to select an analog or digital code in which the amplitudes of the half-waves or periods of an alternating current of one frequency are used as code elements and a different code alternating current is provided for each direction. One direction can also be left in the speech signal range; then, only the other direction is coded. In local communications traffic, both directions may be left in the speech range. The telephone set or optionally even videophone equipment and data transmission equipment must then be converted accordingly. Since telephone sets are mass produced items, it is no problem to produce appropriate chips inexpensively, because it is production of such large numbers that makes microelectronics inexpensive.

If the coding is based on the principle of pulse amplitude modulation according to Canadian Pat. No. 1,214,277 or European Pat. No. EPO 110,427 A2, where the coding is analog based by the size of the amplitudes of the half-waves of an alternating current (the frequency can be reduced by using several code alternating currents) then the exchanges can be equipped with electronic switching matrix networks. Electronic switching matrix networks are a mass produced product so it is expedient not to supply any links at all in installation but instead to provide 100% availability. In long distance communications, this invention can also be used with existing carrier frequency equipment. This invention is especially preferred for long distance communications using a time-division multiplex system when there is either analog coding as described above or digital coding with an alternating current according to German Pat. No. De 3,010,938 C2.

If a greater safety is required of analog coding of a transmission, then the alternating current can be transmitted on the basis of frequency modulation. In addition, this invention shows how the input loudness of speech can be transmitted to the called subscribed at the same amplitude regardless of the service line. Interpretation in the outgoing direction, e.g., in the subscriber's line termination circuit, must be independent of the attenuation of the service line. This can be accomplished in various ways. Attenuation pads may be provided for each service line individually or variable attenuation pads that are adjusted according to the line attenuation of the respective subscriber may be provided for central components such as connector sets, or a value adjustment may be performed by individual measurement of the respective service line by comparison.

The exchange can also be made with the multiplexers and switching matrix networks and the hierarchy steps as in the EWSD and S 12 systems. In the present invention, a quasi-4-wire operation is provided from the subscriber end so the connection groups are substantially different. The through connection is always done on a quasi-4-wire basis.

Subscriber call registering in the known systems is done with 16 kHz pulses during the conversation. This of course has a great influence on the quality of the transmission. In the present invention, the signal identification is transmitted to the subscriber in an advantageous manner. Call charges are then registered at the subscriber's end. The zone can be transmitted by the exchange or it can be determined at the subscriber's end from the area code. Such an arrangement is already known from German Pat. Application No. DE 3,303,699.1 and therefore will not be discussed further here.

DESCRIPTION OF THE DRAWINGS

The present invention will now be explained in greater detail with reference to the figures which show the following:

FIGS. 25 and 26 illustrate bipolar and unipolar PAM sampling circuits, whereas

DESCRIPTION OF THE PREFERRED EMBODIMENTS

Figure 1:
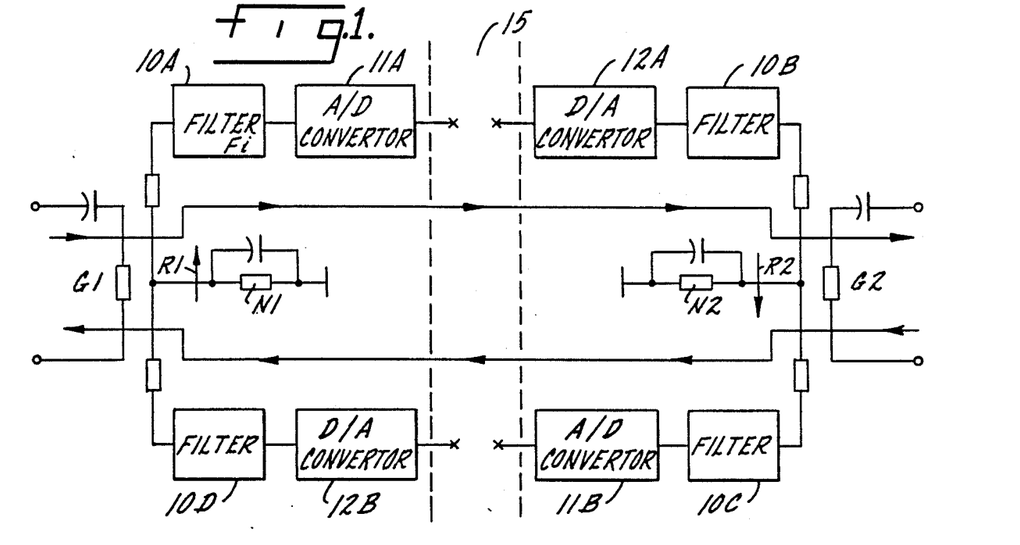
FIG. 1 shows hybrid sets of a 2-wire/4-wire connection or a 4-wire/2-wire connection.

FIG. 1 shows the transmission technical structure of a PECM communications system. High demands are made of hybrids G1 and G2 and the balancing networks N1 and N2 in order to minimize the feedback indicated by arrows R1 and R2. One speech path is over a hybrid circuit G1, a filter 10A, the analog/digital coder 11A, a digital exchange 15, then on the reception side to a D/A decoder 12A and a filter 10B and a hybrid circuit G2 to a terminal exchange. The opposite direction has exactly the same design, comprising, in sequence, a filter 10C, an analog/digital coder 11B, the exchange 15, a digital-/analog converter 12B and a filter 10D.

Figure 2:
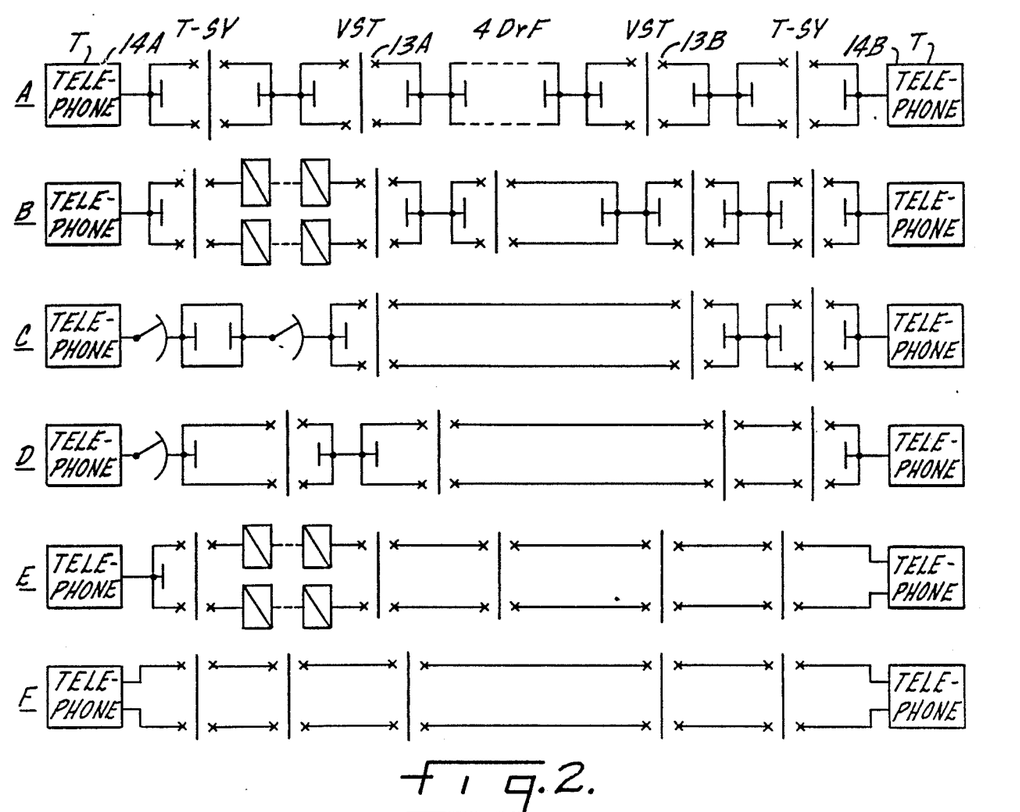
FIG. 2 shows transition phases of a network of 2-wire to 4-wire operation.

FIG. 2 shows the transition phases of a connection network from 2-wire mixed operation to pure 4-wire operation, as shown in FIGS. 2A to 2F. From a subscriber T, telephone 14A, the connection goes to the subscriber system T-Sy, e.g., a private branch exchange or PBX, to the exchange 13A (VSt) and over a 4-wire long distance connection (4-Dr.F) to another exchange 13B (VSt), then through the subscriber system T-Sy to the called subscriber T, telephone 14B. FIGS. 2B-2E illustrate various modifications of the network of FIG. 2A. FIG. 2F shows a pure 4-wire connection.

Figure 5:
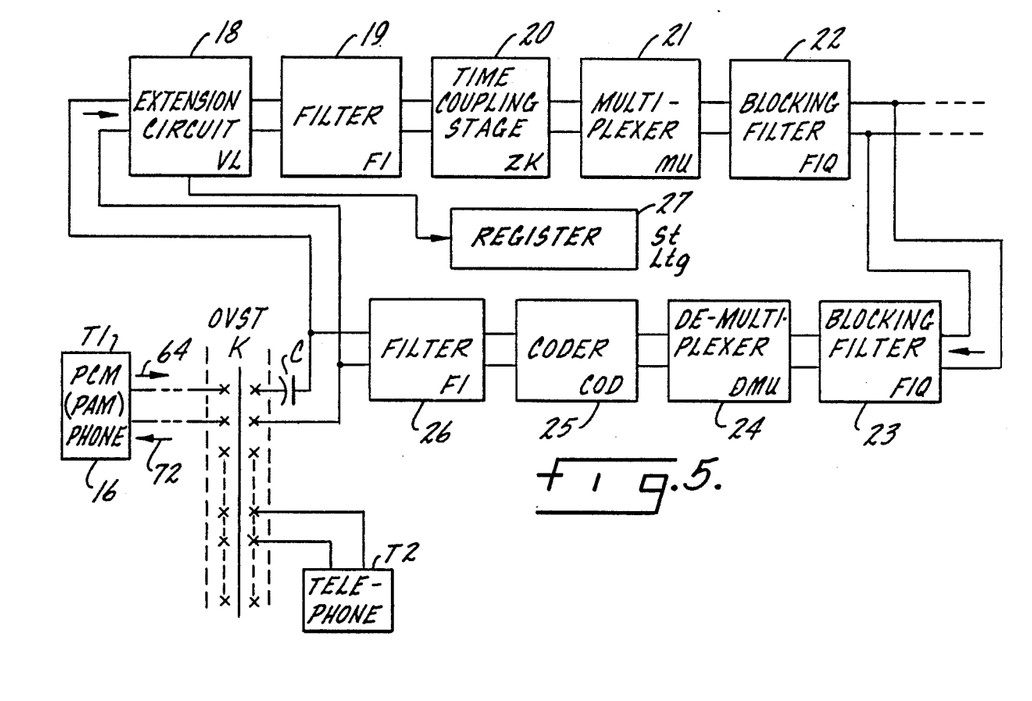
FIG. 5 shows a quasi 4-wire path with two code alternating currents.
Figures 9, 10, 11:
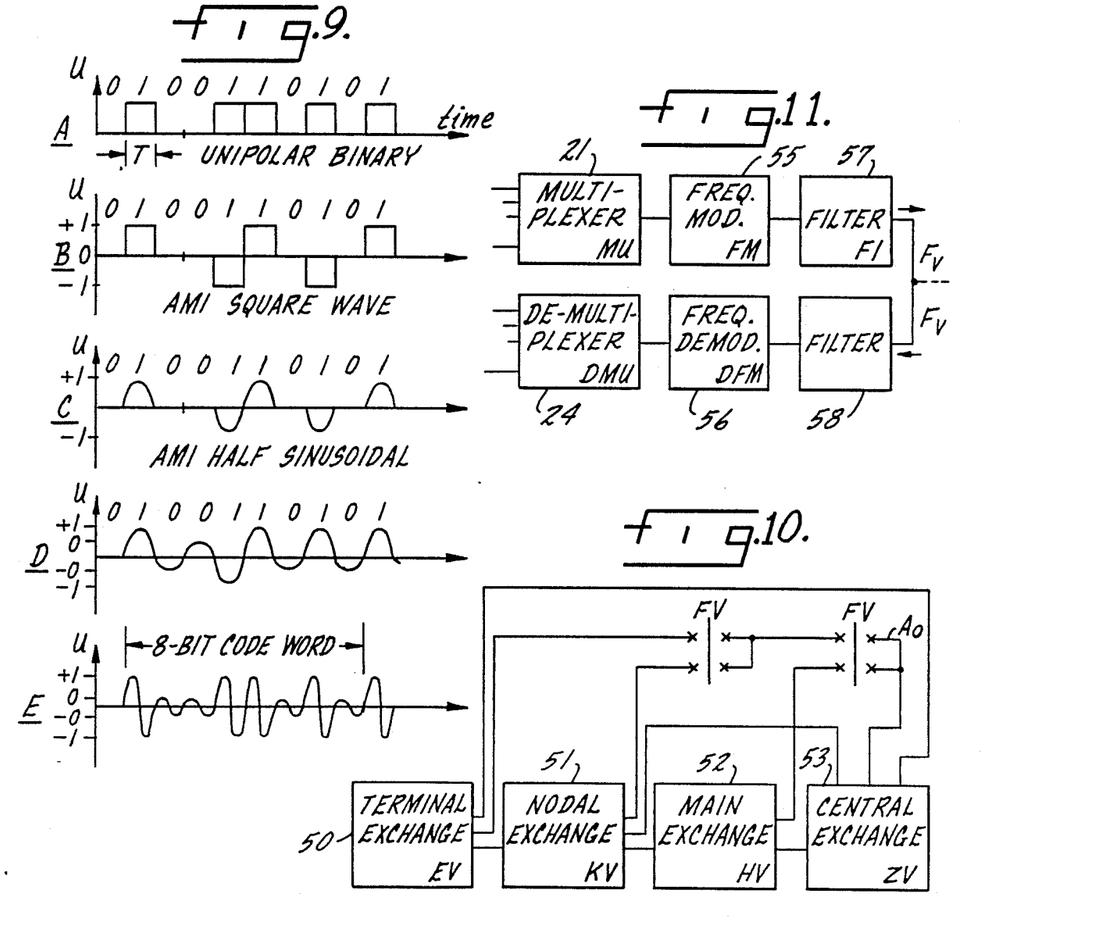
FIG. 9 shows a comparison of a unipolar binary signal and the AMI code for the code alternating current.
FIG. 10 shows a possible terminal exchange-central exchange wiring.
FIG. 11 shows a time-division multiplex combination of code alternating currents to form one code alternating current with transmission on the basis of frequency modulation.

FIG. 5 shows an arrangement according to this invention A code alternating current of 64 kHz is provided at the sending end and a code alternating current of 72 kHz is provided at the receiving end for a subscriber station T1, phone 16. This is a binary digital code. The principle is diagrammed in FIG. 9. First it will be explained in somewhat greater detail. In this code, the binary code elements 1 and 0, as illustrated in FIGS. 9A, 9B, and 9C, are formed from the half-waves or periods transmitted in an uninterrupted sequence of positive and negative half-waves. FIG. 9D shows a code of half-waves and FIG. 9E shows a code of periods. The uninterrupted sequence is the crucial factor here. FIG. 9C shows an AMI code with a half sinusoidal form and zero. In this code, of course, a much broader frequency band is obtained than in FIGS. 9D and 9E. The band in FIG. 9B is even broader when square wave pulses are used. In FIGS. 9D and 9E, the significant conditions are a large amplitude for a value of one and a small amplitude for a value of zero.

In FIG. 5, the period is used as a code element at 64 kHz or at 72 kHz. With a pickup of 8 kHz and an 8 bit code for the pulse amplitude, a code alternating current of 64 kHz is needed, and a code alternating current of 72 kHz is necessary for a pickup of 9 kHz and an 8 bit code for the pulse amplitude. The switching matrix network K in the local exchange OVSt is electromechanical, i.e., it allows the frequency of the code alternating current to pass. When a subscriber T2 is called in local communications traffic, the reception frequency is 64 kHz and the transmission frequency is 72 kHz. In the telephone set, means are provided to distinguish "calling" and "being called".

In long distance communications traffic, the connection going out is switched over an extension line 18 (VL), a filter 19 and a time coupling stage ZK to a time multiplexer 21 (MU). The extension line 18 should match the service lines of different lengths to each other. The length switching of the extension line is performed in this example by the register 27 (Reg), in which the length or the resistance value of each service line is stored. This can be performed by a measurement, e.g., by sending the dialing criteria from the subscriber at a certain level and measuring this and recording it in the register 27 or individually in the outgoing long distance dialing transmission. It is also possible to send an alternating current with which the dialing criteria are coded by the number of periods from the register to the subscriber. Then, by means of a change in resistance at the subscriber end, the respective end of the criteria transmission is determined by measuring the alternating current flowing back as described in German Pat. No. DE 2,915,452 C2. Then the resistance of the service line can also be determined.

Figure 3:
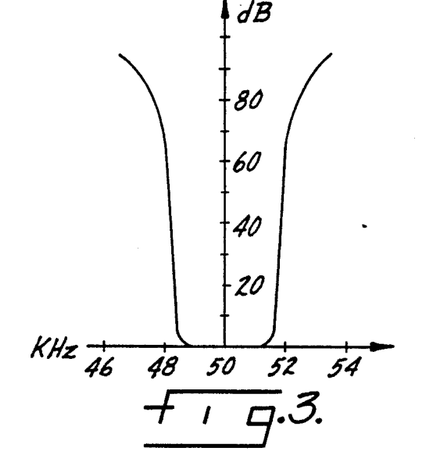
FIG. 3 shows the filter characteristic of a mechanical filter.
Figure 4:
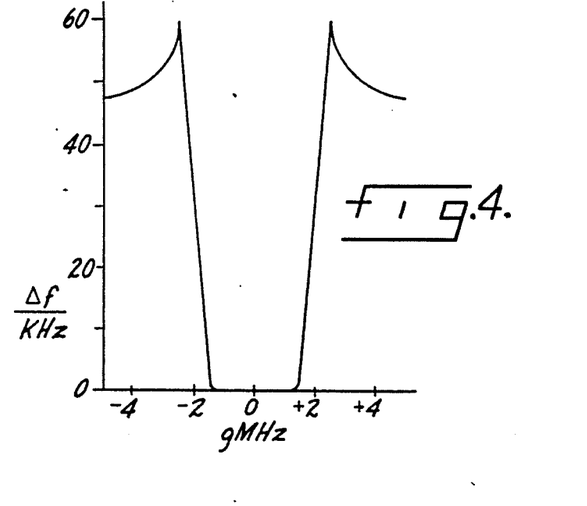
FIG. 4 shows the filter characteristic of a quartz filter.

The filter 19 is a mechanical filter that has a large edge steepness, as shown in FIG. 3. The ZK stage 20 is a time coupler stage chronologically sequenced with the multiplexer 21, here transmitting the binary significant conditions. It is also possible to proceed here according to FIG. 4 by utilizing a limiter to control an electronic switch which then performs a rectification of the code alternating current according to the principle of coherent demodulation. The respective amplitude value can be stored in a capacitor. Then the negative half-wave is not needed. The capacitor is charged again to the next amplitude value with the next positive half-wave, as with the capacitor C in FIG. 27. Due to the fact that the capacitor remains charged with the value of the amplitude during a period as in the example here, it is therefore left to the time multiplexer Mu (circuit 21, FIG. 5) to determine when the pickup takes place, i.e., all connections in one direction may optionally be connected to the time multiplexer without regard to the phase of the code alternating current at the subscriber. The connections are of course permanently connected at the multiplexer. Changes in connections may be made at any time, however.

Figure 27:
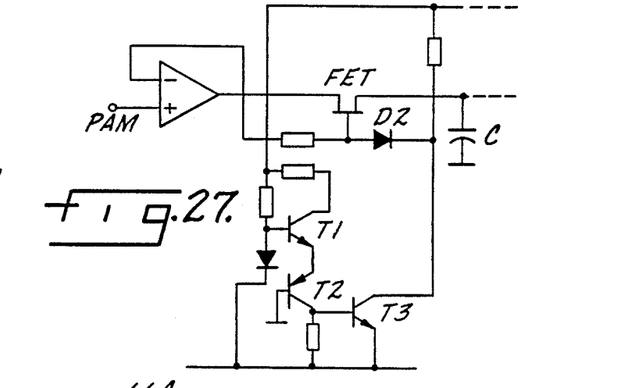
FIG. 27 shows a PAM sampling and holding circuit.
Figure 28:
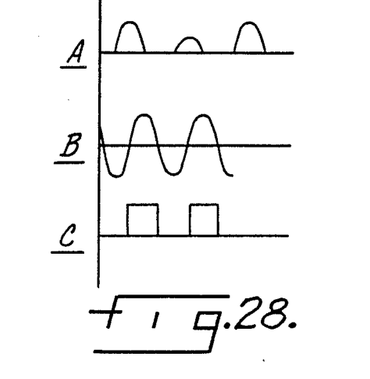
FIG. 28 shows the conversion of alternating current pulses to direct current pulses.

The code alternating current thus need not be synchronized from the register 27. If the charge of the capacitor C (FIG. 27) is to be controlled exactly, the procedure to be followed is shown in FIG. 28. The code alternating current corresponds to that shown in FIG. 8A, where the period is provided as the code element. In FIG. 28A the negative half-wave is always suppressed by this code alternating current. FIG. 28B shows an alternating current of the same frequency but with a 90° phase shift. This alternating current is supplied to a limiter 73, as in FIG. 23, so that pulses are formed as shown in FIG. 28C.

Figure 23:
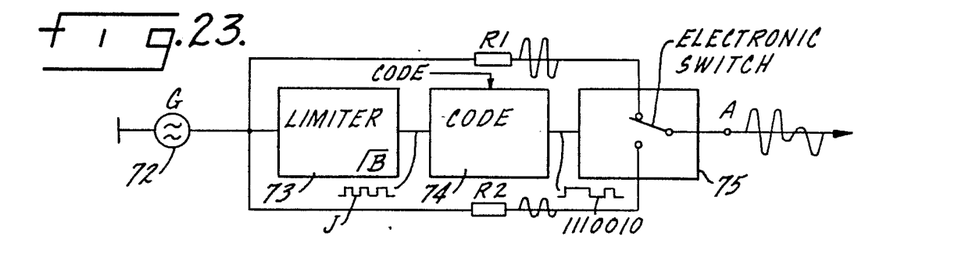
FIGS. 23 and 24 show a circuit for producing amplitude steps for a code alternating current.
Figure 24:
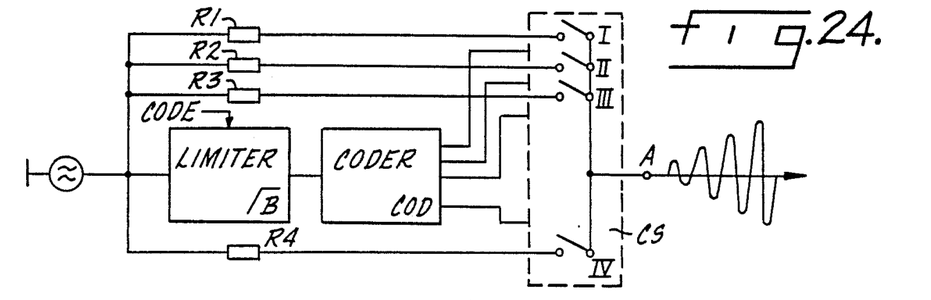

Each pulse begins with the amplitude value of the positive half-waves of the code alternating current. With an electronic switch, the respective amplitude value is then switched briefly to the capacitor C, FIG. 27. Such an electronic switch can be represented by a field effect transistor as shown as FET in FIG. 27. If ten channels are combined in multiplexer Mu, circuit 21 in FIG. 5, then a code alternating current of 10×64 kHz=640 kHz is necessary. This is then connected to the line over a quartz blocking filter FiQ, circuit 22. In the multiplexer 21 a positive and negative half-wave is assigned to each amplitude value of the channels. Production of large and small amplitudes is as illustrated in FIG. 23. The code alternating current of 640 kHz is generated in generator G in FIG. 23, circuit 72. In one case it is sent across a resistor R1 to an electronic switch, circuit 75, and in the other case, it is likewise sent to the electronic switch but this time across a resistor R2. Switch 75 thus connects circuits with different resistances to an output terminal A, FIG. 23; i.e., the half-waves or periods are of different sizes.

Control of the electronic switch 75, FIG. 23, through a code is accomplished with the help of synchronizing pulses J produced in limiter 73 by the same alternating current. The 64 kHz code alternating current and the 72 kHz code alternating current are generated in the same way at the subscriber station. Both directions can be transmitted by 2-wire circuits over fixed lines. The two directions are separated by filters 22 and 23 for 640 kHz and 720 kHz, respectively, FIG. 5. At the receiving end, the 720 kHz code alternating current goes through filter 23 to a demultiplexer DMu, circuit 24, where the respective code element in the form of a large or a small voltage pulse is assigned to each of the ten channels. These pulses are impressed on the periods of the 72 kHz alternating current in a coder COD, circuit 25. Then the current passes through a mechanical filter Fi, circuit 26, tuned to 72 kHz, and over coupler K in the exchange OVST subscriber station T1, circuit 16, where appropriate equipment is available for analyzing the pulse code-modulated speech from the code alternating current of 72 kHz. The subscriber recognition and path control are accomplished by the register Reg, circuit 27 in FIG. 5, and the control of the exchanges is accomplished over a control line StLtg.

Figure 8:
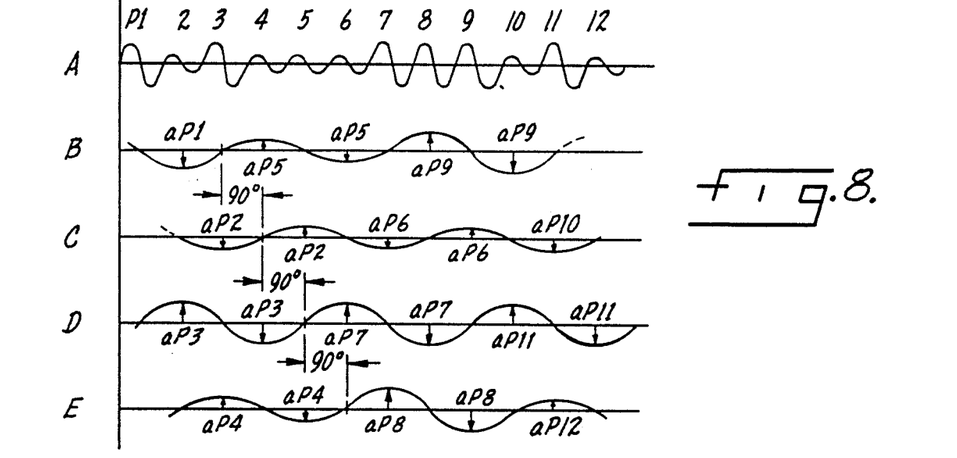
FIG. 8 shows the frequency reduction of a binary code alternating current.

If the half-wave is used as a code element, then only frequencies of 32 or 36 kHz are necessary for the code alternating currents. The filters 22 and 23 can likewise be replaced by mechanical filters. The frequency of the code alternating current can also be reduced by the method of FIG. 8. In FIG. 8A, the code alternating current is 8 kHz and the code element is the period. If a code alternating current of 2 kHz is desired instead of 8 kHz, then four sampling frequencies each of 2 kHz can be provided, each of which is phase shifted by 90° relative to the others. This sampling is then impressed on the periods of alternating currents which are likewise shifted by 90° relative to each other and are in synchronization with the pickup frequency. It can be seen from FIG. 8 that the alternating currents of FIGS. 8A, 8B, 8C, 8D and 8E are phase shifted by 90° relative to each other. The 2 kHz alternating current of FIG. 8B codes sampling P1, P5, P9, . . . , and the 2 kHz alternating current of FIG. 8C codes sampling P2, P6, P10, On the basis of the quadrature amplitude modulation, two 90° phase shifted alternating currents could always be added, but it is also possible to provide only two code alternating currents of 4 kHz that are phase shifted by 180° relative to each other. If both are to be transmitted over one channel with quadrature amplitude modulation, then one of the two must also be phase shifted 90° before transmission.

Thus it is possible here to divide the frequency, quarter it, etc. For example, if the half-wave is selected as a code element, then a code alternating current of 4 kHz is needed for a pickup frequency of 8 kHz and two code alternating currents of 2 kHz are needed for two pickup frequencies of 4 kHz that are phase shifted by 180°. With phase shift of one alternating current by 90° and addition of these two code alternating currents of 2 kHz, an addition alternating current for a speech channel of 16 kHz would be necessary for sampling with an 8 bit code word.

Figure 14:
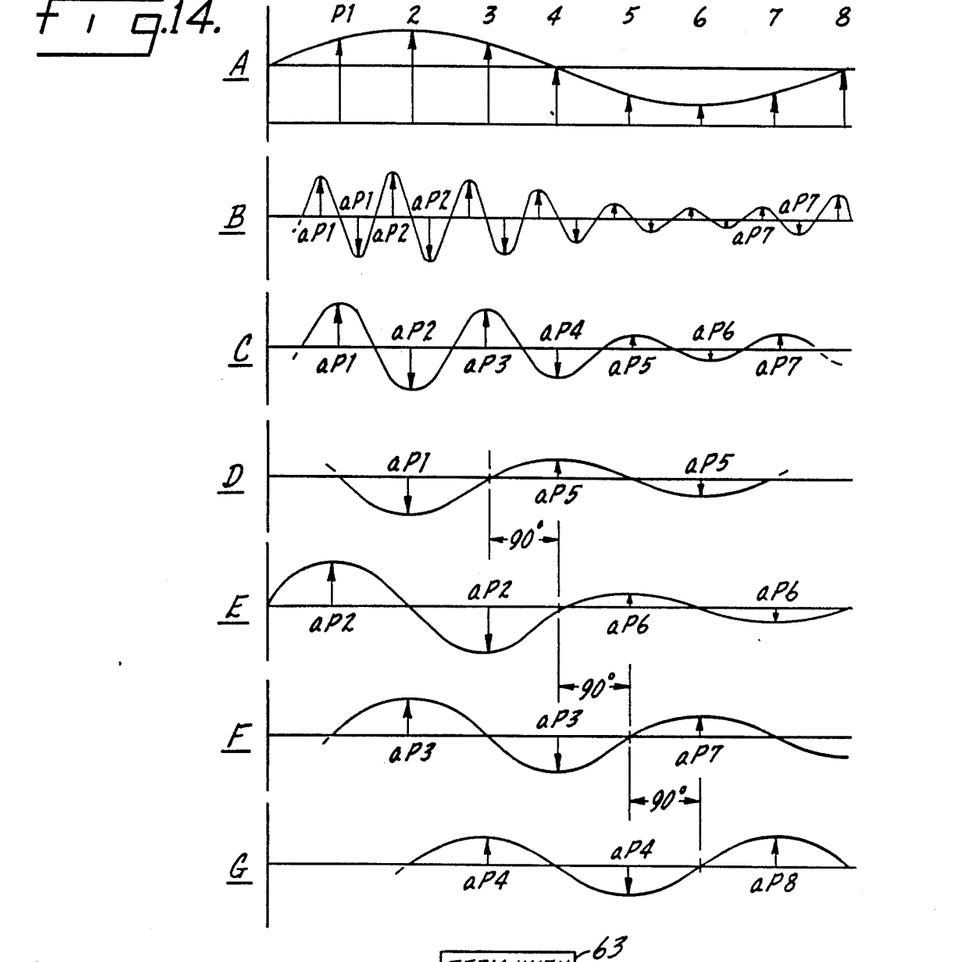
FIGS. 14, 25 and 26 show pulse amplitude modulation with one or more code alternating currents and their production.
Figure 25:
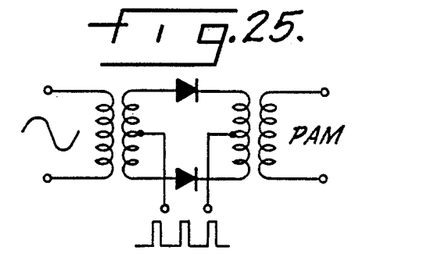
Figure 25A:
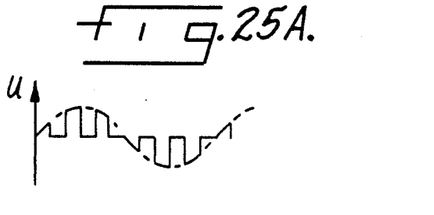
FIG. 25A shows a sampling waveform.
Figure 26:
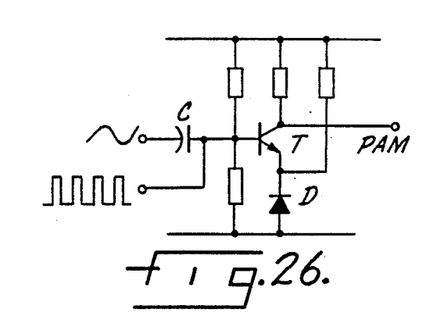

Instead of pulse code modulation (PCM), pulse amplitude modulation (PAM) may also be used FIG. 14 illustrates this principle FIG. 14A shows an oscillation train with sampling P1 to P8. Pickup of the sampling is either bipolar according to FIG. 25 or unipolar according to the circuit of FIG. 26. FIG. 14A shows sampling as unipolar. A sampling circuit is shown in FIG. 27. The sampling values are then impressed either on the periods of an alternating current with the pickup frequency, here 8 kHz, i.e., a code alternating current of 8 kHz, or they are impressed on the positive and negative half-waves of a code alternating current with the frequency 4 kHz. FIG. 14B shows an 8 kHz code alternating current. The positive as well as the negative half-waves then assume the same amplitude value, i.e., sample P1, the positive half-wave aP1 and the negative half-wave aP1 in FIG. 14B, sample P2 with half-waves aP2/aP2, etc. FIG. 14C shows the half-wave as code element in the code alternating current. Sample P1 is impressed on half-wave aP1 and sample P2 is impressed on half-wave aP2, etc. FIG. 14 thus shows an analog transmission of sampling at the amplitudes of the half-waves of the code alternating current.

As already described in regard to FIGS. 8B to 8E, a frequency division or 4-way division, etc., can be obtained by a time multiplex assignment of samples to code alternating currents with one-half, one-fourth, etc. of the frequency of the sum of the pickups where these code alternating currents are phase shifted 360° by 2, by 4, etc., and in order to avoid any need for intermediate storage of the sampling there must be synchronization between the taps and the code alternating currents. FIGS. 14D to 14G show the code alternating currents lower than the repetition frequency of the taps by a factor of four. Therefore, as indicated in the drawing, these are also phase shifted 90 relative to each other. Thus if the pickup frequency is 8 kHz or 4×2 kHz with a mutual phase shift of 90°, then the code alternating currents have a frequency of 2 kHz with a mutual phase shift of 90°. If the half-waves of only one code alternating current are provided as code elements then a code alternating current of 4 kHz is necessary. If two code alternating currents shifted by 180° are used, then the frequency is 2×2 kHz. If one of these code alternating currents is phase shifted by 90° and the two are added, then the entire communication can be transmitted with an alternating current of 2 kHz.

For example, the following possibilities for frequencies are obtained when using PAM coding, namely for sending or receiving: 8 kHz/12 kHz, 4 kHz/6 kHz, 2 kHz/3 kHz. These frequencies can also be varied, e.g., 8 kHz with 3 kHz, etc. The local communications traffic can also be handled as in the past and then a code is provided only for long distance communications traffic. Then, for example, a switch to coding must be performed at the subscriber's end, e.g., with the prefix 0. It is also possible to code in only one direction from the subscriber's end, e.g., the sending direction can be left in the range of 3.4 kHz as in the past and the receiving direction is assigned a code alternating current of 4 or 6 kHz, for example. In order to prevent any feedback from the receiving end into the sending end, appropriate filters must be provided. The larger the frequency distance between the two directions, the more economical it can be to use the filters.

A channel for the transmission of control and selection criteria may also be provided at the multiplexer Mu, circuit 21 in FIG. 5, and the demultiplexer DMu, circuit 24, and this channel is preferably controlled from the register.

Figure 6:
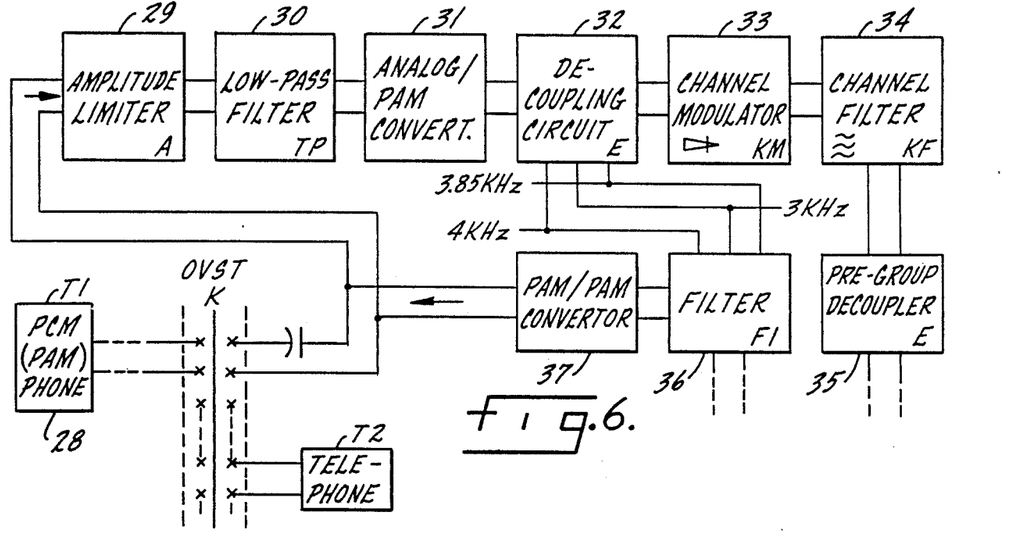
FIG. 6 shows a quasi-4-wire path for long distance communications over existing carrier frequency systems.
Figure 7:
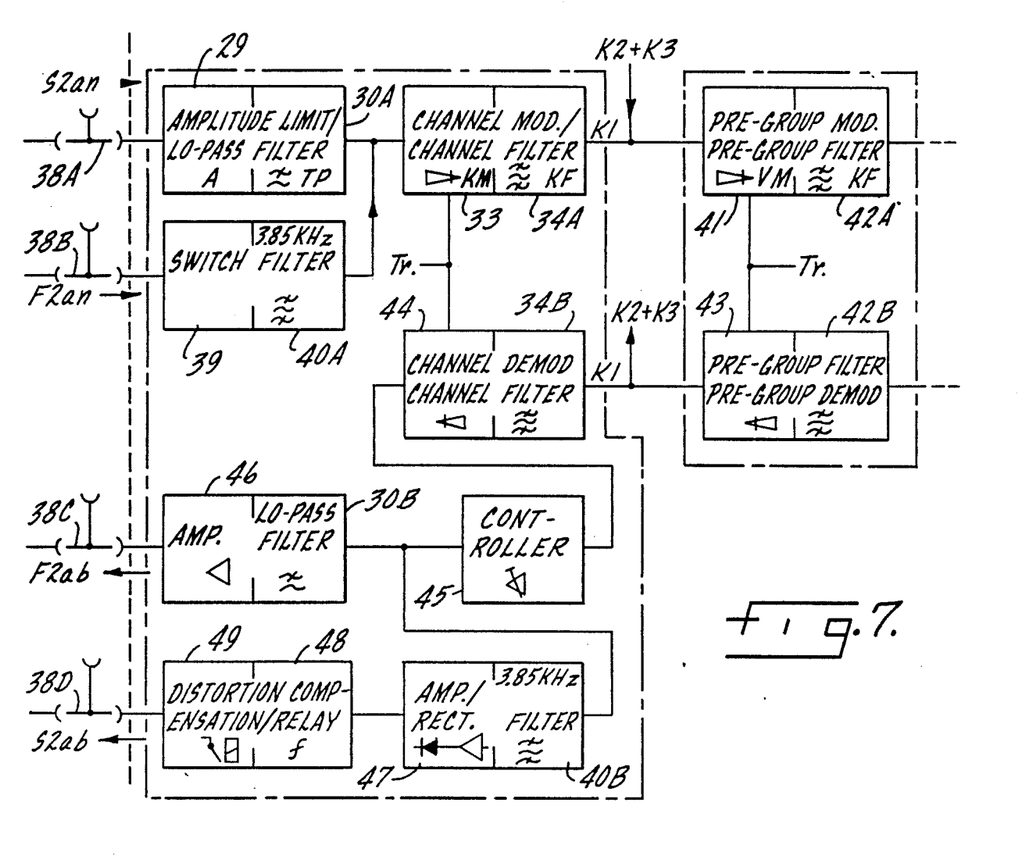
FIG. 7 shows a traditional carrier frequency system.

FIG. 6, which may be considered in conjunction with FIG. 7, shows a circuit for using this invention in existing carrier frequency systems. In FIG. 7, the previous design of the input stage of a carrier frequency system is shown. Thus, FIG. 7 shows four input/output lines, provided with test switches 38A through 38D. An arrow F2an indicates the direction of transmission of the speech channel through switch 38A. Speech is sent in the frequency range from 300 Hz to 3.4 kHz over an amplitude limiter A, circuit 29, and a low pass filter TP, circuit 30A, to a channel modulator KM, circuit 33, and in parallel the signals are sent, through a switch circuit 39 and a filter 40A, at 3.85 kHz. In the next circuit 34A, the channel filter KF, the carrier and the upper sideband are filtered out. Together with channels 2+3, the sidebands are then sent to the pregroup modulator VM, circuit 41, and another filter 42A. Channels K1 to K3 are filtered out in the filter VF at the incoming end and sent to the pregroup modulator VM. The channel filters KF, circuits 34A and 34B, screen the individual channels to separate them. The incoming speech signals go over a demodulator filter 34B, a demodulator 44, a controller 45, a low pass filter 30B, and an amplifier 46 and then to the hybrid set as indicated at F2ab. The control signals go over a separate path S2ab comprising a 3.85 kHz filter 40B, an amplifier/rectifier 47, a distortion compensation circuit 48 and a relay 49 to the long distance dialing transmission.

In FIG. 6, the local communications traffic is handled in the area of the speech band. In the long distance communications traffic, the speech alternating currents are sent in the direction of transmission over the exchange OVST, with the switching matrix network K to the amplitude limiter A, circuit 29, and the low pass filter TP, circuit 30A, to the analog/pulse amplitude modulation converter 31. The speech signals are converted there to a code alternating current 2+2. The samples are then transmitted to the half-waves of two code alternating currents that are phase shifted by 180°. Subsequently, one of them is further phase shifted by 90°. Then the two are added and transmitted as an alternating current with a frequency of 2 kHz or sent to a decoupler E, circuit 32, where the signals with 3.85 kHz and two data channels with 3 and 1 kHz are also connected to it. Then the sidebands go over the channel modulator KM, circuit 33, and channel filter KF, circuit 34, through another decoupler 35 to higher stages of the carrier frequency system.

The incoming carrier frequency mixture is sent, after the demodulation stages, to a filter 36 where the 1, 2, 3 and 3.85 kHz alternating currents are separated. The speech code alternating current 2+2 is converted to a code alternating current of 4 kHz in the PAM 2+2/PAM 4 converter 37 and sent to the subscriber 28, station T1, over the switching matrix network K. Reflection in the direction of transmission is prevented by the low pass filter TP, circuit 30. An analyzer that converts the code alternating current to the speech alternating currents is provided at the subscriber's end, in station 28. Electronic switching matrix networks can be used when 4 kHz code alternating currents are used. If electronic switching matrix networks are present, a code alternating current of 6 kHz may also be provided, for example.

Figure 15:
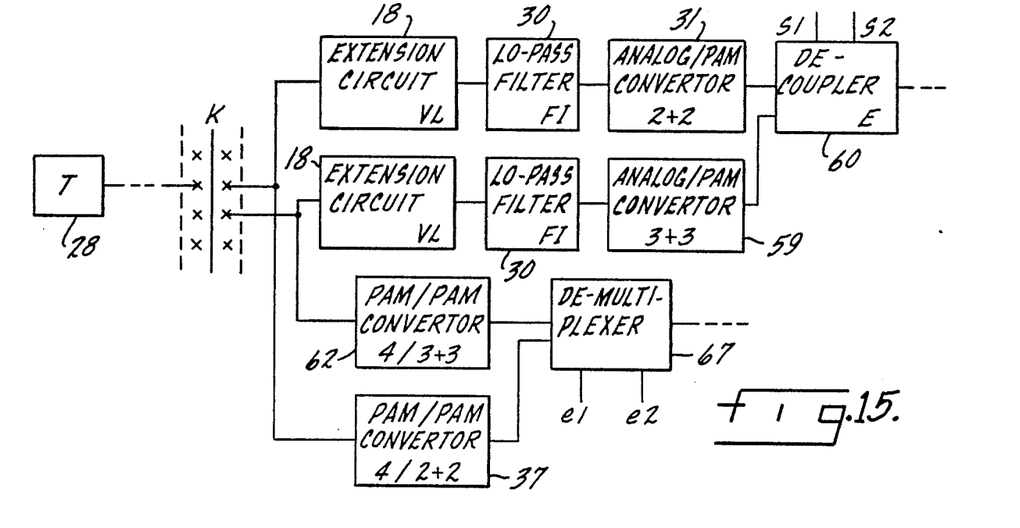
FIG. 15 shows an existing carrier frequency system with which two speech channels can be transmitted over one channel.

Instead of data channels of 3 kHz and 1 kHz, a second speech channel can also be switched over the same carrier frequency channel. FIG. 15 shows a circuit for this purpose. The code alternating current 2+2 is developed by the sequence of circuits 18, 30 and 31; see FIGS. 5 and 6. A similar circuit, using another extension circuit 18, a low-pass filter 30, and an analog/PAM converter 3+3, circuit 59, is connected to another output of the switching matrix metwork K and connected to a channel modulator (not shown) over a decoupler 60 that has two inputs 51 and 52 as well as an input from convertor 31. S1 and S2 are the signal lines for the two channels, namely 3.85 kHz for one channel in the example and 1 kHz for the other channel. At the receiving end, the alternating currents of 3.85, 3, 2 and 1 kHz are separated in a demultiplexer 67; one is sent to a converter 2+2/4, circuit 37, which converts the additional alternating current from 2 kHz to a code alternating current of 4 kHz and transmits it to the subscriber station 28. The other case, the 3+3 kHz addition alternating current, is converted in circuit 62 to a code alternating current of 4 kHz and sent to the calling subscriber.

Figure 19:
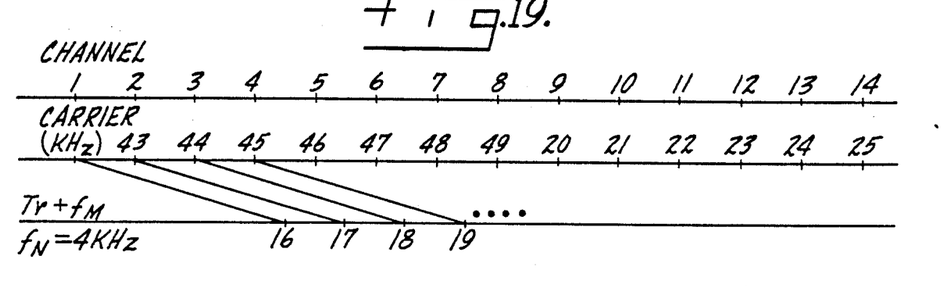
FIGS. 19 and 20 show carrier frequency systems for single-frequency code alternating currents.
Figure 20:
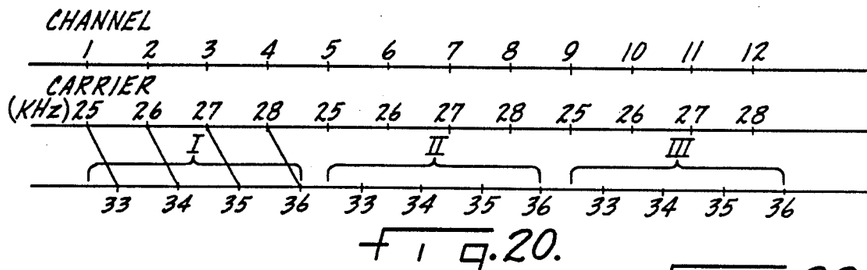

The carrier frequency systems may also be laid out in a much different manner. Two examples are shown in FIGS. 19 and 20. In FIG. 19, the carrier spacing is 1 kHz. The carriers 12, 13, ..., 25 kHz are assigned to channels 1, 2, 3, ..., 14. If the lower band and the carrier are filtered out, then after modulation, the sidebands or frequencies of 16, 17, 18, ... kHz are obtained with a code alternating current of fN of 4 kHz. FIG. 20 shows the channels 1 to 12 subdivided into 3 groups of four and assigned to carriers 25, 26, 27 and 28 kHz. The code alternating current fN is 8 kHz. If the carrier and the low side frequency are filtered out, then one group has the frequencies 33, 34, 35 and 36 kHz.

Regenerators can be used with pulse code modulated signals, just as with other codes. With pulse amplitude modulated alternating currents as in FIGS. 14B and 14C, this is also possible if one channel is provided as a comparison channel with a constant amplitude so amplitude fluctuations can be transmitted to the working channels similarly.

In FIG. 11, in order to be independent of amplitude fluctuations, transmission of the code alternating current is based on frequency modulation. In multiplexer Mu, circuit 21, the different channels are combined to one code alternating current as already described in FIG. 5, then sent to a frequency modulator 55 and supplied to the line through a filter 57. The return channel is a similar sequence of circuits, comprising a filter 58, a frequency demodulator 56, and the demultiplexer 24 (see FIG. 5). Sending and reception can take place over one line and operation can also be performed in a 4-wire system.

Figure 13:
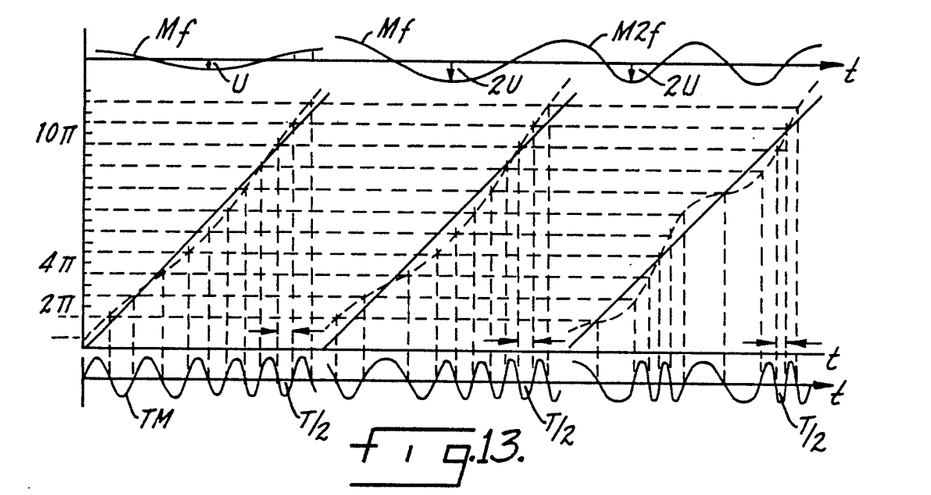
FIG. 13 shows frequency modulation as a function of amplitude and frequency.

For directional radio and also for other radio services, the frequency modulated code alternating current can be modulated onto the sending alternating current on the basis of single sideband modulation. Since the information is fixed only by the size of the amplitudes, i.e., is independent of frequency, a much narrower band is also necessary with frequency modulation as indicated in FIG. 13. Mf is the modulation vibration with the amplitude U in one case and then with the amplitude 2U, M2f is a modulation vibration with the amplitude 2U and the frequency 2f. As indicated by the modulated carrier TM, the period T/2 is smallest with the modulation vibration with the double amplitude and double frequency. Since only the amplitude changes in the present case, consequently, the band width of the frequency modulated carrier is much smaller than with an additional change in frequency.

Figure 12:
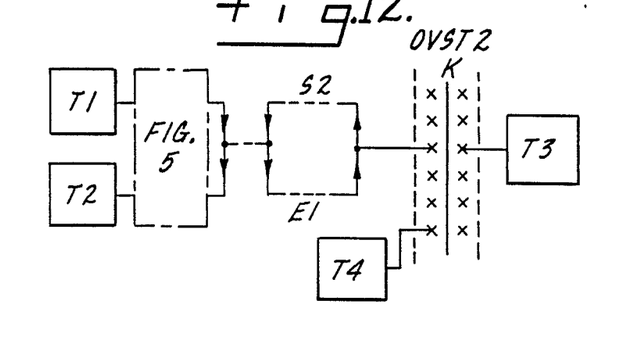
FIG. 12 shows a connection diagram of an arrangement according to this invention.

FIG. 12 shows a connection from the local exchange OVST1 of FIG. 5 to another local exchange OVST2. If subscriber T1 calls subscriber T3 a connection is formed over the switching matrix network K of the local exchange with the equipment at the sending end (FIG. 5) as a 2-wire connection over the long distance path with the reception equipment E1, the switching matrix network K of the local exchange OVST2, to subscriber T3. The speech from T3 goes over S2, the 2-wire long distance line, and then to subscriber T1.

One possible network layout from a terminal exchange EV, circuit 50, to a central exchange ZV, circuit 53, is shown in FIG. 10. Direct connections go here from the terminal exchange 50 to a nodal exchange KV, circuit 51, and from there to a main exchange HV, circuit 52, and from there to the central exchange 53. Regenerators (not shown here) may of course also be necessary in the long distance paths. These may be 2-wire or 4-wire systems depending on what is more economical in a given case. If sufficiently large bundles are necessary from the terminal exchange to the central exchange, a direct bundle will be switched. If the two exchanges 50 and 53 are separated by great distances, then a 4-wire wiring may be effectively provided by means of directional radio, for example. In the case of coaxial cables and glass fibers, the economic factor will decide whether 2- or 4-wire systems will be selected. In addition, long distance exchanges FV can be provided if a better line utilization is achieved in this way. Depending on the coding, the exchanges can be equipped with electronic switching matrix networks, optionally even with 100% availability. In the case of long distance exchanges, only electromechanical switching matrix networks can be used due to the information bundling (band width).

Figure 17:
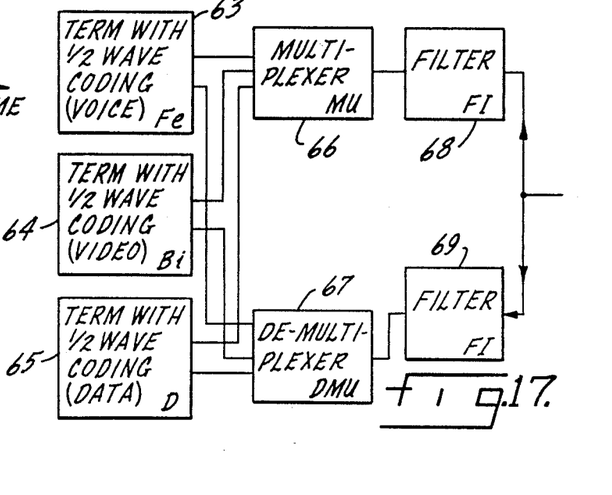
FIG. 17 shows a time multiplex division system at the subscriber's end with a time coupling stage.

The type of coding is very favorable for an ISDN network. FIG. 17 shows terminal equipment 63 for telephoning (Fe), a terminal 64 for video transmission (Bi), and a terminal 65 optionally for videophones and for data transmission (D). For combining the code elements, a multiplexer Mu, circuit 66, is provided, and a demultiplexer, DMu, circuit 67, is provided for distribution of the code elements. Filters 68 and 69 are included to segregate incoming from outgoing signals. Since the code is fixed in the amplitude of the half-waves, the multiplexer 66 may receive digital as well as PAM coded signals from circuits 63–65. It is assumed that a code alternating current of 64 kHz is fixed at the transmission end. This can be divided into speech, video and data, e.g., when using half-waves as code elements and a binary digital code (FIG. 9D). 32 kHz can be used for speech and the remaining 32 kHz would then remain for video plus data. If the remaining 32 kHz were provided for video or data, then 64 kbit would be available for video transmission. However, as specified by Western Electric Company in German Pat. No. DE 1,135,954, an image of 2.5×2.5 cm with about 3600 pixels is sufficient for the viewing distance of the telephoner, in which case a new image is necessary every second. This means that 32 kbit would be sufficient for image transmission for a videophone and thus also larger images could be represented. By appropriate arrangement of the multiplexer and/or by appropriate coding, even more information can be transmitted.

If the half-waves are used as code elements, then one would have 128 kbit with a 64 kHz code alternating current. Then, if two multiplexers are operated in parallel, each with 64 kHz code alternating current but phase shifted 90° with respect to each other and then the two are added, 256 kbit can be transmitted with this 64 kHz signal. However, the lower frequency ranges are not utilized in this way. Thus a code alternating current of 32 kHz or even 16 kHz would be sufficient.

Figure 29:
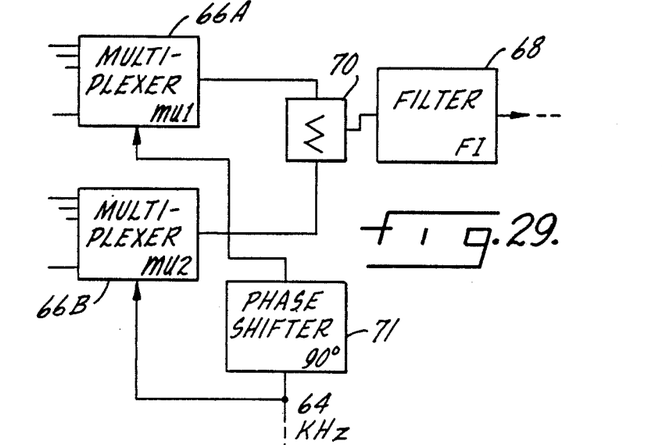
FIG. 29 shows two multiplexers with a 90° phase shift and a quadrature-modulated transmission at the subscriber's end.
Figure 30:
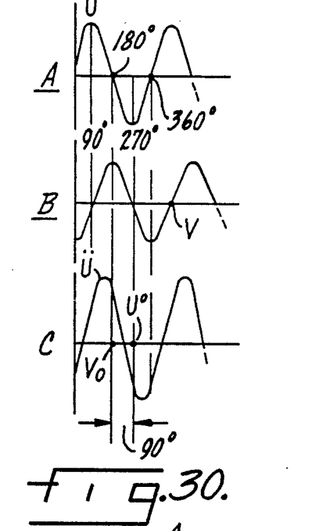
FIG. 30 shows a diagram of a quadrature modulation.

FIG. 29 shows two parallel multiplexers M1 and M2, circuits 66A and 66B, which are each supplied with a 64 kHz code alternating current; a phase shift of 90° is provided in one feed line in a circuit 71. The two code alternating currents are added in an adder Ad, circuit 70, and sent through a filter to the line. As indicated in FIG. 30, an alternating current of the same frequency as in FIG. 30C is obtained by adding the two 90° phase shifted alternating currents of FIGS. 30A and 30B. When the two alternating currents are separated, a reference angle is necessary. This angle can be determined, e.g., by brief transmission of one of the two alternating currents of FIGS. 30A or 30B. Such forms of analysis are known. Addition of two code alternating currents of the same frequency can of course also be provided in transmission over long distance lines, e.g., the multiplexer and demultiplexer in FIG. 5, and the same thing is also true for FIG. 11. Addition would have to take place before the frequency modulator and analysis or separation of the two alternating currents would have to take place after the demodulator DM at the receiving end. Smaller frequencies can also be obtained by multistep coding.

Figure 18:
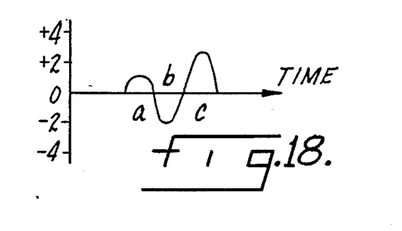
FIG. 18 shows multivalued amplitude coding.
Figure 21:
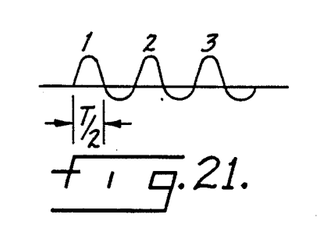
FIG. 21 shows amplitude/phase coding.

FIG. 18 shows a 3-digit code word and a 3-step code word. The digits are formed by the half-waves and the steps are formed by amplitudes of different sizes. The possibilities that result from FIG. 18 are thus 3 to a power of 3, i.e., 27. In binary coding, only 2 to a power 3 combinations, i.e., 8 combinations would be possible. Furthermore, a phase code could also be provided. For example, 3 amplitude levels and 3 phase levels are illustrated in FIG. 21. Three half-waves have different half periods T/2.

Figure 22:
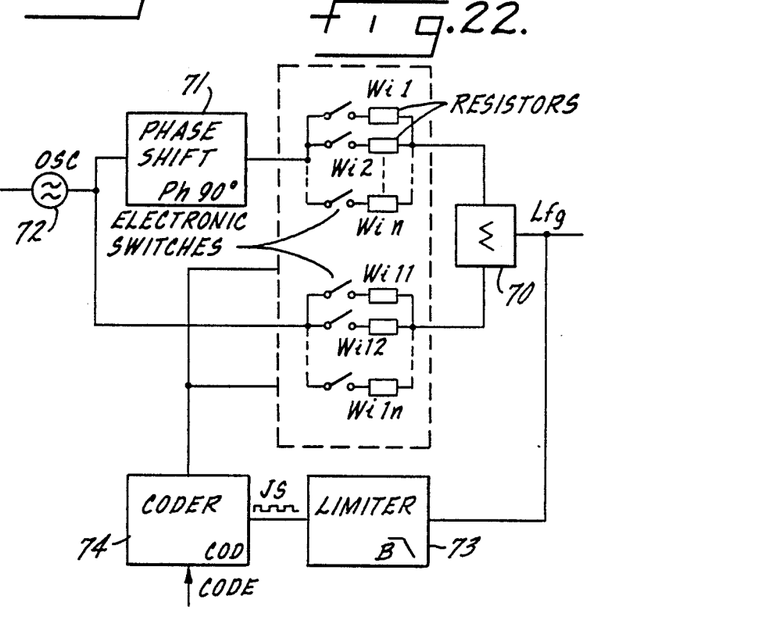
FIG. 22 shows a circuit for phase shifting.

In addition, the direction of the phase change can also be provided as another step. Analysis of the phase change can be performed with a reference phase or by analysis of the change per code word or differential phase. FIG. 22 shows how such a phase change is produced. The code alternating current is generated in the oscillator 72 and distributed into two circuits A phase shift pH of 90° is provided in one circuit 71. In addition, each of these circuits has an arrangement with resistors that are switched on or off, depending on the desired phase change and depending on the coder. The outputs of the two parallel circuits are then added in the adder 70 and the total alternating current is sent to the line. Depending on the size of the vectors of the two alternating currents that are shifted 90° relative to each other, the phase position of the total alternating current, i.e., with a change in resistance in one or both circuits, a change is also created in the phase position of the total alternating current. The resistors are activated by electronic switches controlled by a coder 74. The respective resistors are Wi1 to Win and Wil1 to Willn. In order for the phase change to take place only in the zero passage, the total alternating current is branched off and sent to a limiter B, circuit 73, where pulses JS are produced with which the coder 74 is then controlled only in the zero passage of the total alternating current from line terminal Lfg.

Figure 16:
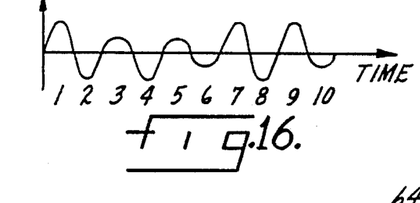
FIG. 16 shows alternating current coding with the amplitudes of the half-waves and addition of code alternating currents.

FIG. 16 shows a code alternating current for a binary code with the half-waves as code elements and the significant states shown as large and small amplitudes.

If a direct current option is necessary, the period is selected as a code element. Companding is not absolutely necessary with PCM, because a signal-to-noise ratio of 65 dB is also achieved with 11 code elements in binary coding. With the present coding, regenerators may also be used, and the same thing is also true for frequency modulation because in the present case a very narrow frequency band is needed. With analog coding based on amplitude, a comparison channel may be used and then amplitude fluctuations are equalized with the working channels.

Figure 35:
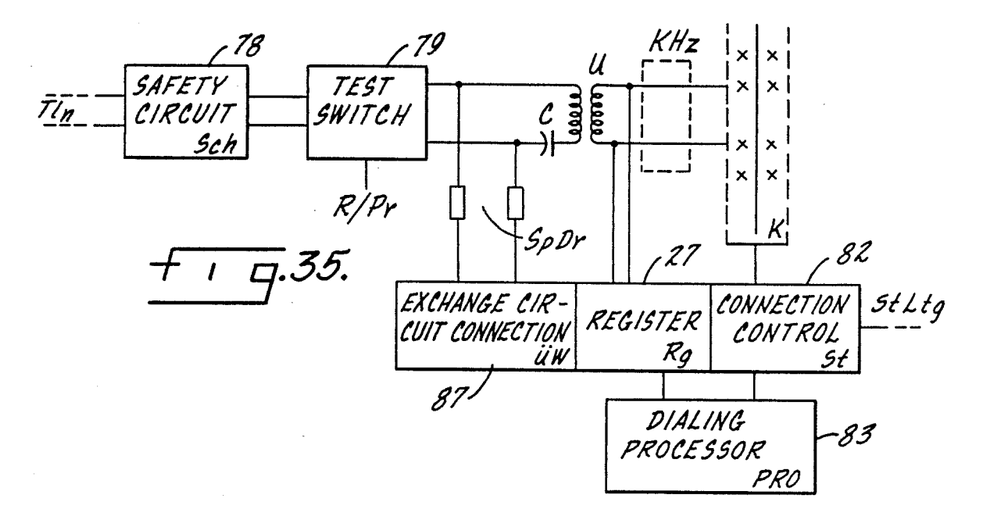
FIG. 35 shows a subscriber circuit.

FIG. 35 shows a subscriber circuit. The 2-wire, quasi-4-wire subscriber line Tln goes over a safety circuit Sch, circuit 78, and over switch contacts SK, in a test switch unit 79 that are provided for the calling current and for test purposes to the transformer U. Power is supplied through a throttle SpDr from a control UW, an exchange circuit connection 87. After the transformer, the line goes to the switching matrix network K and parallel with it to the register 27 (see FIG. 5). The selection is controlled and analyzed by the register. There are a number of methods here which will be mentioned only briefly. The multifrequency touch dialing method is the most commonly used today. There is a process according to German Pat. No. 2,915,452 whereby the respective amplitude change can be measured in the reflection by the number of periods of an alternating current which is sent by the register and thus is influenced at the subscriber's end. In addition, a process is also known according to German Pat. Application No. 2,938,776.6, whereby the coding is based on the combination of the length of two alternating currents. Both processes are as reliable as DTMF but are not as expensive. In the processor PRO, circuit 83, the dialing information is analyzed and the switching matrix network is controlled over the control unit St, circuit 82. A control line StLtg is connected to the control unit St and control signals are sent by it to the higher ranking exchange. For example, a control system according to German Pat. No. DE 2,635,032 C2 is appropriate for EMD dialers.

Figure 31:
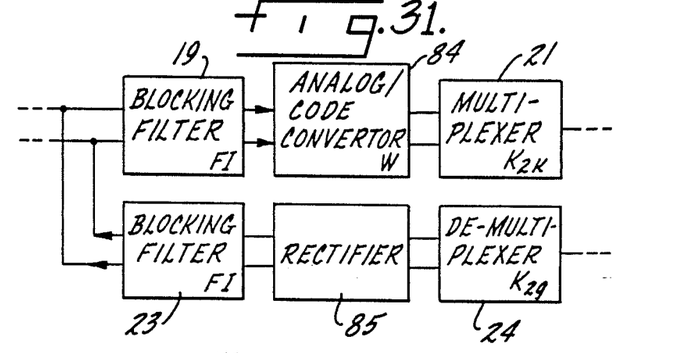
FIG. 31 shows a subscriber circuit with multiplexer.
Figure 32:
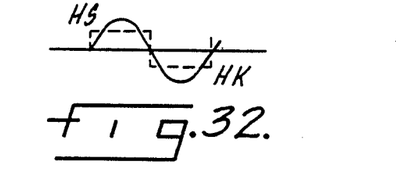
FIG. 32 shows rectification of the code elements for pickup.

FIG. 31 shows a detail of a subscriber circuit, whereby the exchange equipment and specifically the terminal stages are designed in the time division multiplex system. Here again, the hierarchy stages of EWSD and the S12 system can be used. For example, a 64 kHz code alternating current is sent from the subscriber according to FIG. 5. This is sent to a rectifier 85 through filter 19 and converted to direct current pulses with the help of a limiter as shown in FIG. 32. In time multiplex tapping, a large or small voltage is then picked up. In FIG. 32, half-waves are shown as binary code elements that have been rectified and processed to pulses in the limiter.

Figure 33:
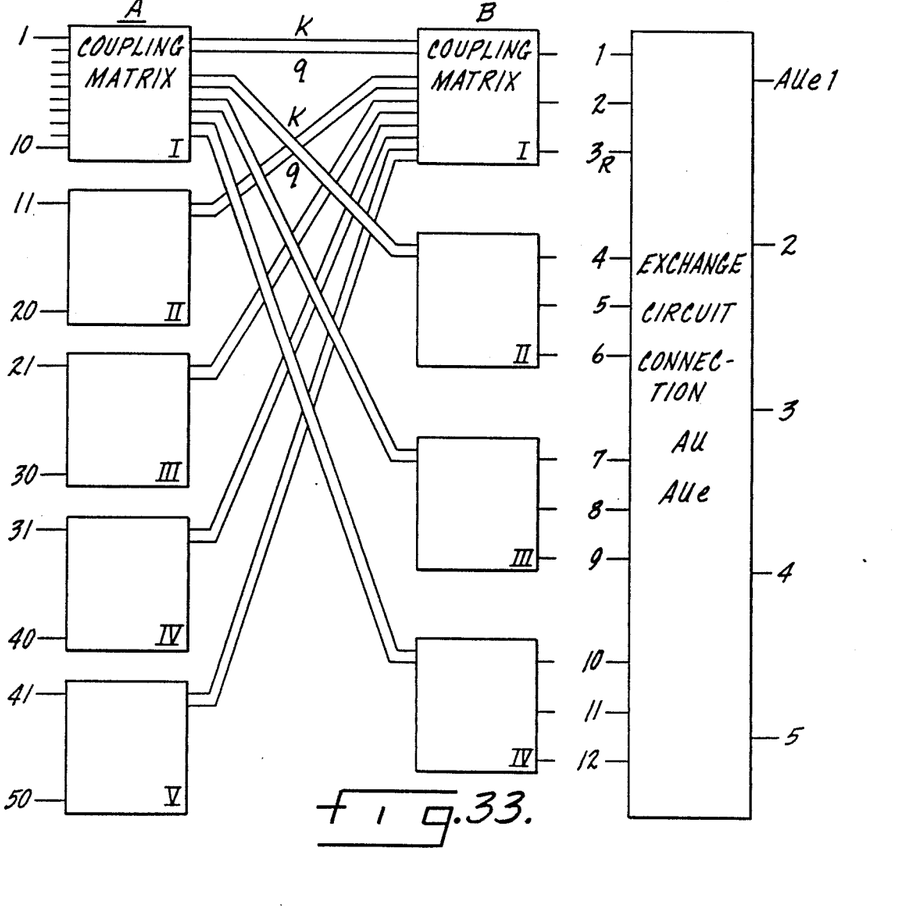
FIG. 33 shows a switching matrix network.

Mechanical switching matrix networks are very expensive. Due to this quasi-4-wire connection, only half as many switching elements are needed. A further reduction in switching elements is illustrated in FIG. 33. The principle is described as follows. A small system with calling and line switchers needs two switching matrix networks during the connection. In this invention, a central line coupler is switched on only during the connection buildup and is turned off again on a signal by the called subscriber. The connection to the called subscriber is then established over the calling coupler. A detailed description is given in German Pat. No. DE 2,837,357 A1. Stereo audio lines can also be switched on the basis of the principle according to this invention but under some circumstances several channels would then have to be provided for this purpose.

Figure 34:
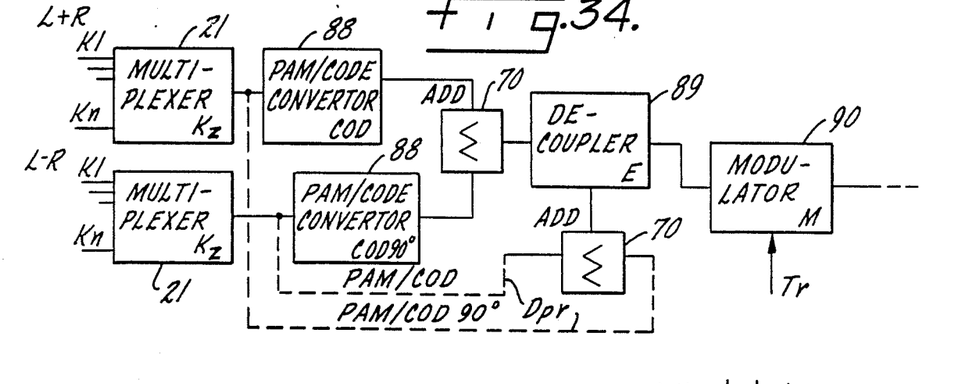
FIG. 34 shows EB transmission of a code alternating current with automatic volume control.

A partial segment of such a connection can also go over radio. FIG. 34 shows such an arrangement. Samples are picked up over concentrators for L+R and L-R (coding is done with sinusoidal alternating currents). The L+R signals are sent through one multiplexer 21 sent to a first PAM/Cod converter 88. The code alternating current of L-R is phase shifted by 90° and passed through a like circuit. Both alternating currents are then added in the adder Ad circuit 70, and sent over a decoupler 89 to the modulator M, device 90. In order to equalize fading effects on the radio path, a second code shown with dotted lines is provided with another code alternating current. This double program DPr is sent over another adder 70 and the decoupler 89 to the same modulator 90. With single sideband modulation, a screen element is also provided after the modulator (not shown) to screen out the carrier and the upper and lower sideband frequencies. This process is described in German Pat. Application No. DE 3,629,706.2.

Figure 36:
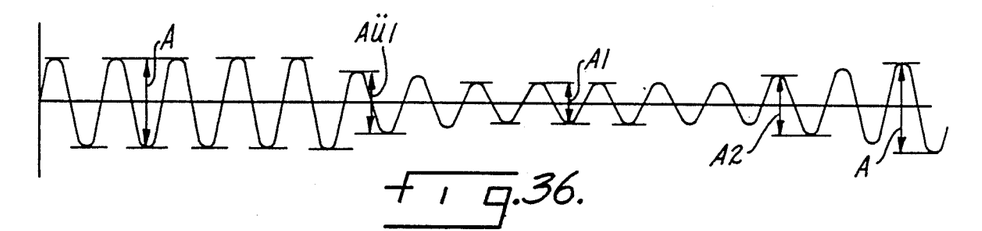
FIGS. 36 and 37 show a digital code and an analog code.
Figure 37:
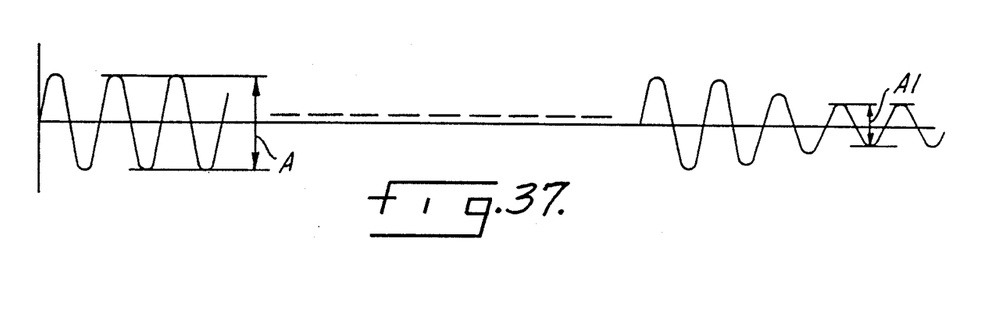

If only security plays a role in transmission of information but the frequency does not play a role, then coding can be performed according to FIGS. 36 and 37. In FIG. 36, the binary code element is marked by a predetermined number of periods of an alternating current and the change in the significant condition is marked by a change in amplitude (A, A1). In FIG. 37, the code elements is marked similarly by the number of periods and the following code element is marked by another amplitude (A, A1). This code is described in greater detail in German Pat. Application No. DE 3,629,706.2.

I claim:

1. In a telecommunication system of the kind comprising:

a plurality of subscriber stations each capable of generating electrical output signals representative of information, in a given initial frequency range, and each capable of utilizing electrical input signals in the given initial frequency range to reproduce information represented thereby;

an exchange;

a plurality of subscriber lines, each connecting one subscriber station to the exchange; and a long distance line connected to the exchange;

the exchange including exchange switching means for connecting each subscriber line to each other subscriber line for local communication and to connect each subscriber line to the long distance line for long distance communication;

the system improvement comprising:

the long distance line comprising two branches, an outgoing branch for transmission of the output signals from a subscriber station as outgoing signals to a distant location and an incoming branch for transmission of incoming signals from a distant location;

said outgoing branch including frequency shifting means for shifting the frequency of an output signal on that branch to produce a frequency shifted outgoing signal;

said outgoing branch further including filter means, interposed between said exchange and said frequency shifting means, for blocking frequency shifted incoming signals;

each subscriber station comprising signal separation means for maintaining input signals separate from output signals;

and each subscriber station comprising demodulator means for demodulating an incoming frequency shifted signal to develop an input signal utilizable for reproduction by the subscriber station.

2. An improved telecommunication system according to claim 1 in which the frequency shifting means in the outgoing branch of the long distance line is an analog/digital converter.

3. An improved telecommunication system according to claim 1 in which the frequency shifting means in the outgoing branch of the long distance line is an analog/analog encoder.

4. An improved telecommunication system according to claim 1 in which the frequency shifting means in the outgoing branch of the long distance line comprises:

sampling means for repetitively sampling the output signal from a subscriber station in accordance with a predetermined time pattern;

and pulse amplitude modulator means for varying the amplitude of pulses in an outgoing signal in accordance with such sampling.

5. An improved telecommunication system according to claim 1, and further comprising a plurality of different attenuation means for compensating for different attenuations in the subscriber lines.

6. An improved telecommunication system according to claim 5 in which each attenuation means is an attenuator having a signal-variable attenuation factor, and further comprising a central processor, connected to all of the attenuation means, for adjusting the attenuation factor of each attenuator.

7. An improved telecommunication system according to claim 6 in which the central processor includes a memory in which the attenuation factors of all of said lines are stored and said central processor controls the attenuation factors of the variable attenuators to equalize the attenuation throughout the system.

8. An improved telecommunication system according to claim 6 in which the central processor controls the attenuation factors of the variable attenuators according to a measurement made during call connection completion.

9. An improved telecommunication system according to claim 1, in a system comprising a plurality of long distance lines having varying attenuations, and further comprising a plurality of different attenuation means for compensating for different attenuations in the long distance lines.

10. An improved telecommunication system according to claim 9 in which each attenuation means is an attenuator having a signal-variable attenuation factor, and further comprising a central processor, connected to all of the attenuation means, for adjusting the attenuation factor of each attenuator.

11. An improved telecommunication system according to claim 10 in which the central processor includes a memory in which the attenuation factors of all of said lines are stored and said central processor controls the attenuation factors of the variable attenuators to equalize the attenuation throughout the system.

12. An improved telecommunication system according to claim 10 in which the central processor controls the attenuation factors of the variable attenuators according to a measurement made during call connection completion.

13. An improved telecommunication system according to claim 1 in which at least one of said subscriber stations includes means for calculating communication fees according to an official tariff and according to time of connection, said time of connection being measured by said calculating means based on a start signal transmitted to said subscriber station as soon as a call connection is completed and said tariff is transmitted to said calculating means from a central processor.

14. An improved telecommunication system according to claim 1 in which at least one of said subscriber stations includes means for calculating communication fees according to an official tariff and according to time of connection, said time of connection being measured by said calculating means based on a start signal transmitted to said subscriber station as soon as a call connection is completed and said tariff being derived from the code of the number dialed.

15. An improved ISDN-capable (Integrated Services Digital Network) telecommunication system comprising:

a plurality of subscriber stations each capable of generating electrical output signals representative of information, in a given initial frequency range, and each capable of utilizing electrical input signals in the given initial frequency range to reproduce information represented thereby;

an exchange;

a plurality of subscriber lines, each connecting one subscriber station to the exchange, each subscriber line comprising a 4-wire-subscriber line or a quasi-4-wire subscriber line, defined as a two-wire-line in which incoming and outgoing signals are transmitted in separated frequency bands;

each subscriber station including separation means for maintaining incoming signals from the exchange separate from outgoing signals to the exchange and decoding means for decoding incoming signals from the exchange;

each of said subscriber stations further including frequency shifting means comprising at least two sampling means for sampling the output signals at a predetermined sampling rate, with a phase spacing of 90 degrees, and for translating the output signal into a coded outgoing signal according to the following code:

(a) as code elements there are provided the amplitudes of half-waves of two alternating currents of the same frequency each transmitted in an uninterrupted sequence of positive and negative half-waves;

(b) the coding alternating currents, phase shifted through 90 degrees, are added and transmitted as an alternating current of like frequency; and (c) for the outgoing signal of the called subscriber there are provided coding alternating currents of such frequency that separation is maintained from the coding alternating currents of the incoming signal, utilizing filter means to maintain that separation.

16. An improved telecommunication system according to claim 15 in which the frequency shifting means comprises:

pulse amplitude modulator means for varying the amplitude of pulses in an outgoing signal in accordance with such sampling.

17. An improved telecommunication system according to claim 15, and further comprising a plurality of different attenuation means for compensating for different attentuations in the subscriber lines.

18. An improved telecommunication system according to claim 17 in which each attenuation means is an attenuator having a signal-variable attenuation factor, and further comprising a central processor, connected to all of the attenuation means, for adjusting the attenuation factor of each attenuator.

19. An improved telecommunication system according to claim 15 in which at least one of said subscriber stations includes means for calculating communication fees according to an official tariff and according to time of connection, said time of connection being measured by said calculating means based on a start signal transmitted to said subscriber station as soon as a call connection is completed and said tariff is transmitted to said calculating means from a central processor.

20. An improved telecommunication system according to claim 15 in which at least one of said subscriber stations includes means for calculating communication fees according to an official tariff and according to time of connection, said time of connection being measured by said calculating means based on a start signal transmitted to said subscriber station as soon as a call connection is completed and said tariff being derived from the code of the number dialed.

21. An improved ISDN-capable (Integrated Services Digital Network) telecommunication system comprising:

a plurality of subscriber stations, each capable of generating electrical output signals representative of information, in a given initial frequency range, and each capable of utilizing electrical input signals in the given initial frequency range to reproduce information represented thereby;

an exchange;

a plurality of subscriber lines, each connecting one subscriber station to the exchange, each subscriber line comprising a 4-wire-subscriber line or a quasi-4-wire subscriber line, defined as a two-wire-line in which incoming and outgoing signals are transmitted in separated frequency bands;

each subscriber station including separation means for maintaining incoming signals from the exchange separate from outgoing signals to the exchange and decoding means for decoding incoming signals from the exchange;

each subscriber station further including frequency shifting means comprising at least two sampling means for sampling the output signals at a predetermined constant sampling rate, thereby producing at each sample instant a sample value corresponding to the value of the sampled output signal in the instant of sampling, all said sampling means having the same sampling rate and a constant phase relationship to each other;

the frequency shifting means further including at least two alternating current generating means assigned to each of said sampling means for generating coding alternating currents, each of an equal constant frequency, the amplitudes of the coding alternating currents varying in accordance with the sampled value and thus being representative of the sampled value;

said frequency shifting means further including means for adding at least two coding alternating currents phase shifted by 90 degrees to each other, to produce one alternating current of like frequency;

said frequency of said coding alternating currents for said outgoing signal being such that separation is maintained from the corresponding coding alternating current of the incoming signal, filter means maintaining said separation.

* * * * *